Nov. 12, 1935.　　　G. F. ROYER　　　2,020,800
SCREENING APPARATUS
Filed March 21, 1933　　4 Sheets-Sheet 1

Inventor
George F. Royer
By Cushman, Bryant, Darby & Cushman
Attorneys

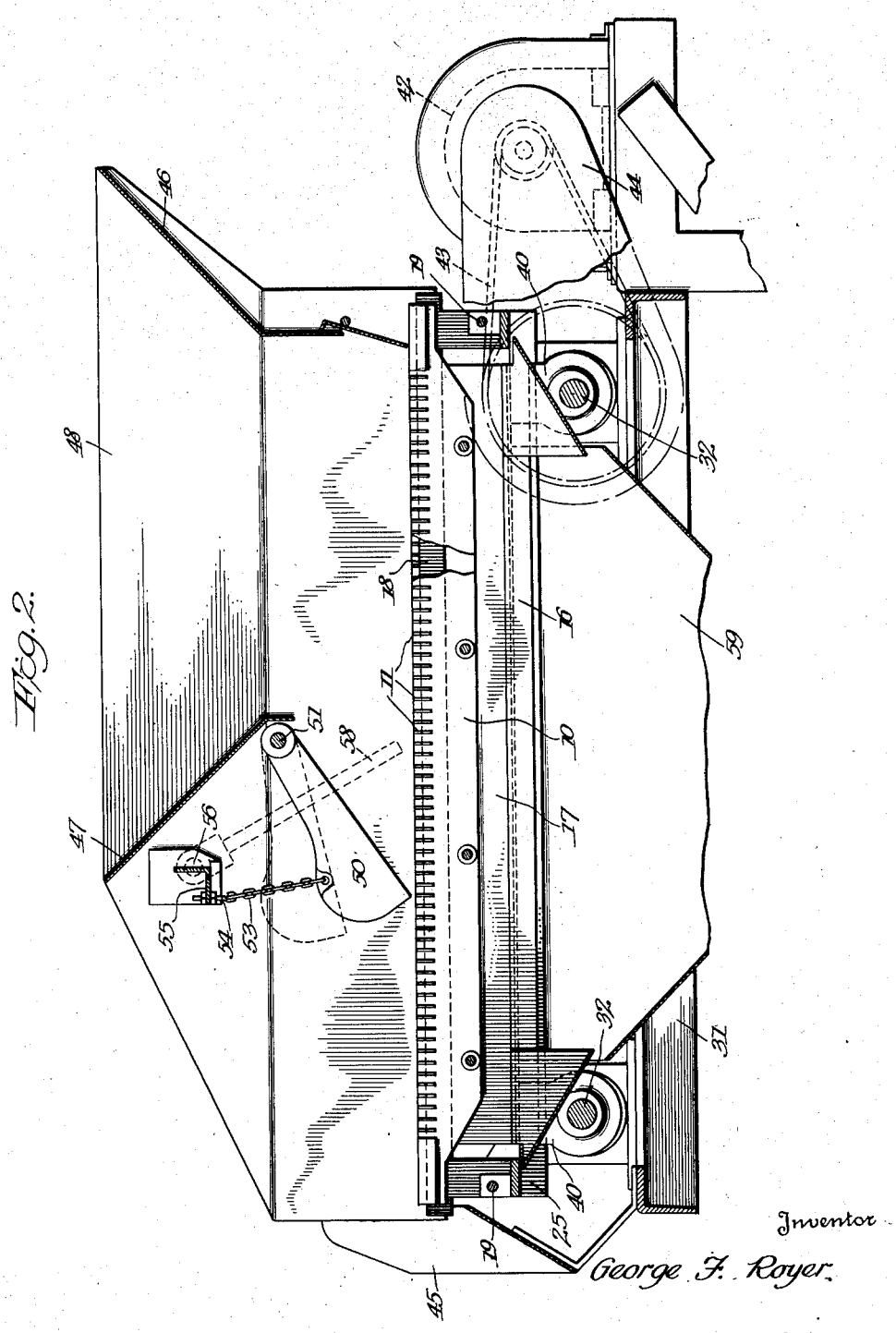

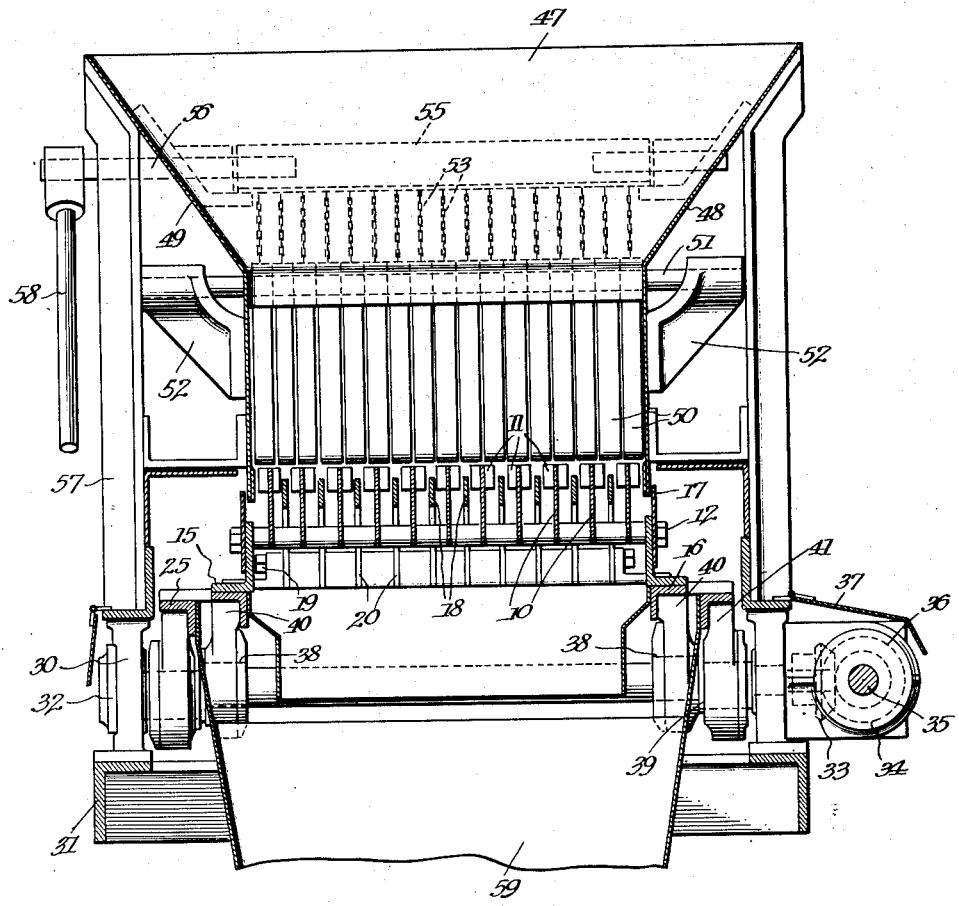

Nov. 12, 1935.                G. F. ROYER                 2,020,800
                           SCREENING APPARATUS
                        Filed March 21, 1933      4 Sheets-Sheet 4
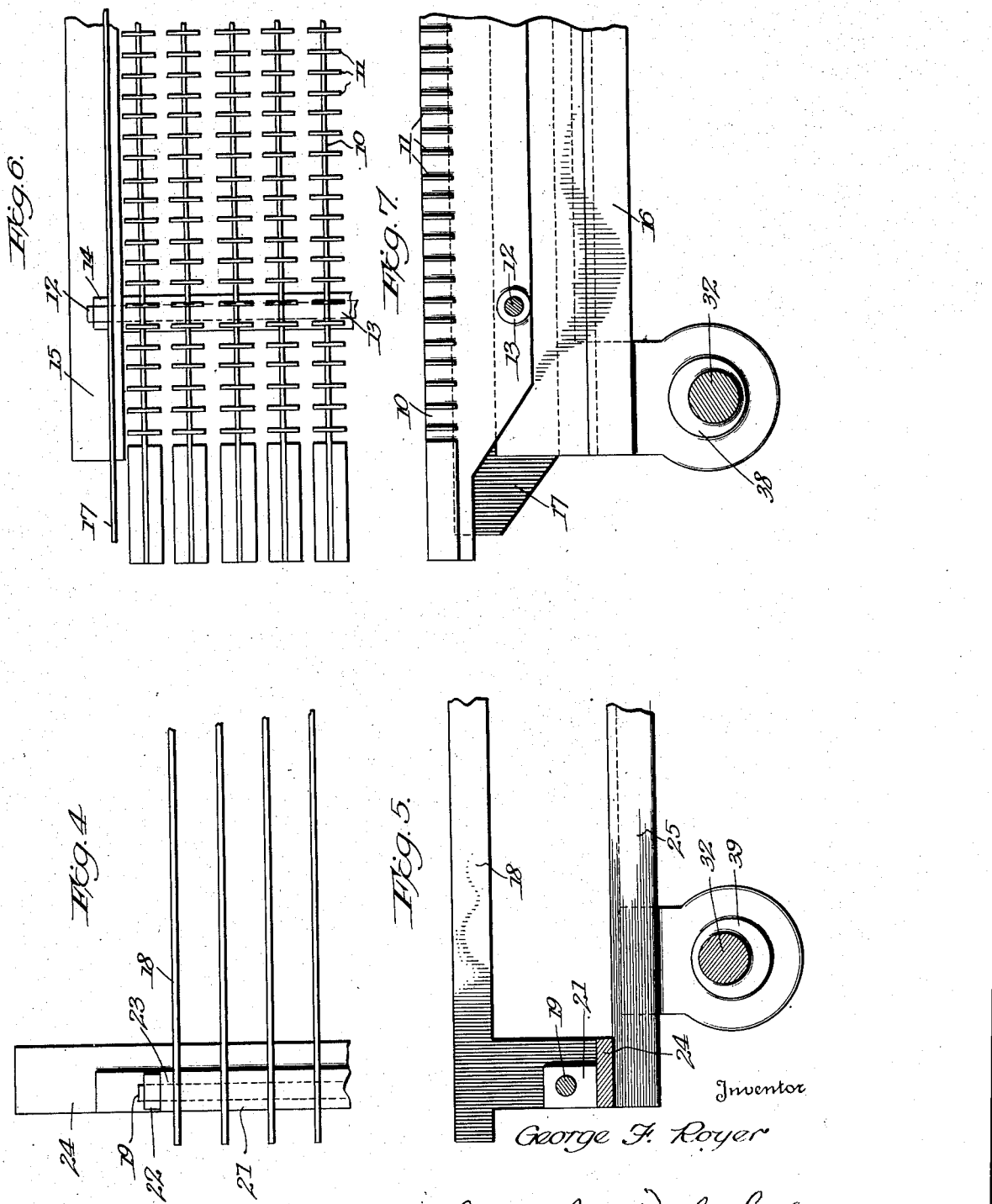

Patented Nov. 12, 1935

2,020,800

UNITED STATES PATENT OFFICE 2,020,800

SCREENING APPARATUS

George F. Royer, Wilkes-Barre, Pa., assignor to Royer Foundry & Machine Co., Wilkes-Barre, Pa., a corporation of Pennsylvania Application March 21, 1933, Serial No. 661,956

4 Claims. (Cl. 209—396)

This invention relates to a new and improved screening apparatus, and more particularly to an improvement over the type of apparatus disclosed in my prior United States Patent 1,860,480 May 31, 1932. The apparatus of this invention is well adapted for use with the type of sand gathering, conveying, and cleaning apparatus disclosed in my prior Patents, Nos. 1,860,481 and 1,559,915.

It is a primary object of the present invention to provide a new and improved form of a screening body, which, although similar in purposes, function, and mode of operation to the screening body disclosed in my aforesaid Patent 1,860,480, obviates certain inherent disadvantages thereof, which have become noticeable after extended commercial use.

To this end, the screen of the present invention is made up of two relatively movable grids, the individual elements of which are disposed in non-overlapped relation, whereby clogging of the screen by impurities below the upper, effective screening surface, is prevented.

With a screen constructed in accordance with the disclosure of my patent afcresaid, it has been found that there is some likelihood that fins, gaggers, nails or other impurities may become lodged in the slots between the fingers 2 of the comb member 1. Because of the fact that the longitudinally disposed screening bars 10 of that construction are positioned for relative movement in those slots, it sometimes happens that movement of the bars 10 toward the bottom of the slots wedges impurities into contact with the walls of the slots with tremenduous force, so that such impurities are not shaken loose and the screen is not cleared. When this occurs, the screen becomes clogged, relative movement between the two sets of screening members is interfered with, and the efficiency of the device as a whole is impaired. I have discovered that this disadvantage can be obviated by entirely eliminating overlapping horizontally disposed surfaces on the two sets of screening members, so that in no case can relative movement between the sets of screening members result in wedging impurities tightly against the elements of either set. Furthermore, I have discovered that by the elimination of upwardly facing surfaces below the effective screening surface, any impurities which pass by the upper edges of the screening elements cannot be arrested, even temporarily, in their downward passage through the screen, and clogging is prevented.

Consequently, it is a primary object of the present invention to provide a screen in which the individual members of the two grids comprising the screening body do not overlap, and in which no upwardly facing surfaces are positioned below the effective screening surface, to interfere possibly with the discharge of small impurities after they have passed the upper edges of the screening elements.

It is a further object of the invention to provide a screen made up essentially of two sets of screening members, the individual elements of which are disposed in substantial parallelism, and to support the sets so that they may be given oppositely timed, translational movements on a substantially circular orbit.

It is a further object of the invention to provide the screening surface with longitudinally and transversely extending screening elements, but disposed in non-overlapped relation to each other. Preferably, the transversely extending elements take the form of short fins secured to the elements of one or another, or both of the sets of longitudinally extending members.

When the several elements of a screening body are moved in accordance with the disclosure of my Patent 1,860,480 (which movement is broadly protected by said patent), impurities which are deposited upon the screening surface and all material which does not pass through the screen, tend to move toward one end of the screen. In order to prevent the discharge of screenable material over that end of the screen, retarding means are disposed above the screening surface. In the patent aforesaid, the retarding means takes the form of a plurality of angularly and downwardly depending spring-pressed fingers, which normally retard the material, but which are adapted to be deflected upwardly when large impurities come in contact therewith. It has been found that such spring-pressed fingers are disadvantageous because their resistance to deflection increases greatly with an increase in the size of the material passing thereunder, with the result that unusually large impurities sometimes cannot be discharged. It is an object of the present invention to overcome this disadvantage of the patented machine, and, to this end, I provide material retarding arms which are adapted to effect a constant retarding action on all material passing thereunder, said arms having a constant resistance to displacement irrespective of the amount or size of the material. As a specific embodiment of a retarding means adapted to function in this manner, I disclose a plurality of weighted arms.

In the accompanying drawings, a specific embodiment of my improved apparatus is disclosed, in which:

Figure 2 is a vertical longitudinal sectional view, with certain parts broken away for the sake of clearance;

Figure 3 is a vertical transverse sectional view, taken substantially on line 3—3 of Figure 1;

Figure 4 is a fragmentary plan view of one of the units, grids, or sets of screening elements;

Figure 5 is an elevational view of the device shown in Figure 4, partly in section;

Figure 6 is a plan view of the other unit, grid, or set of screening elements;

Figure 7 is an elevational view of the parts disclosed in Figure 6.

Figure 1:
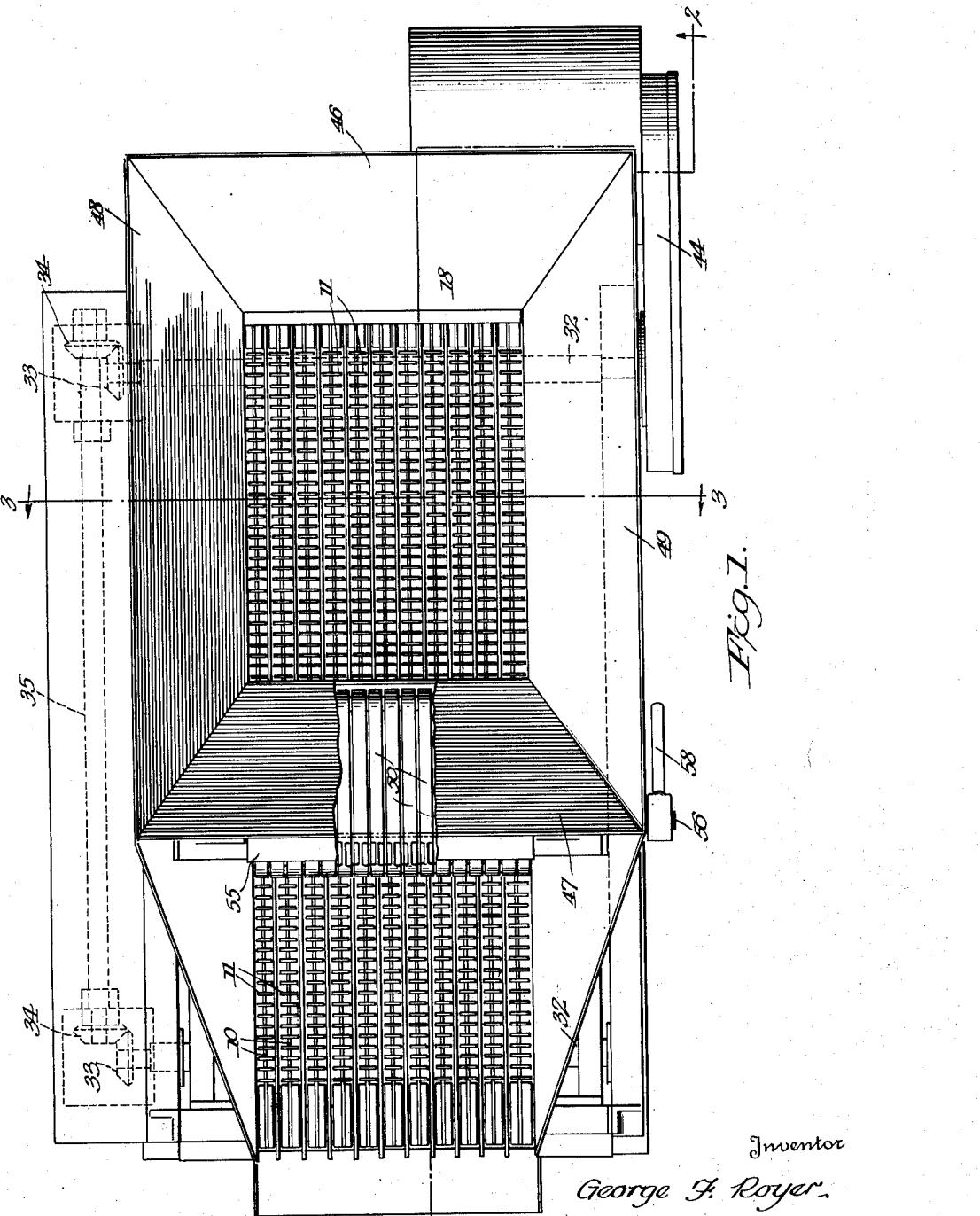
Figure 1 is a plan view.

The specific form of screening body disclosed in the drawings comprising two units or sets of screening elements. One is made up of a plurality of vertically and longitudinally disposed parallel plates or bars 10, each of which is provided with transversely disposed parallel fins or fingers 11. The latter may be in the form of substantially rectangular plates welded or otherwise secured to the members in appropriate slots extending downwardly the proper distance from the upper edges thereof. The individual screen elements of the first set are rigidly secured together in predetermined relation by means of a transversely extending bolt 12 having spacer collars 13 thereon and nuts 14. Two or more such bolts may be provided and, in Figure 2, I disclose the use of four. Opposite ends of the bolts extend through appropriate holes in longitudinally disposed side frame members 15, which may conveniently be made from angle iron stock, and mounted upon similar lower frame members 16. Guard plates 17 may also be held in operative relation to the screen by means of the bolts 12.

The other unit or grid of the screening body comprises a plurality of parallel, longitudinally disposed screening plates or bars 18 secured in predetermined relation to each other by means of bolts 19 extended through appropriate holes in depending enlargements 20 formed integrally with each member 18. Between each pair of plates, on each bolt 19, is a spacer block or collar 21, and between the outermost plates and the nuts 22, there are angle fittings 23, the lower outwardly turned end of each of which is secured to a transversely extending horizontally disposed frame member 24. Each transverse frame member 24 has its ends secured to longitudinally disposed, substantially parallel angle iron supporting frame members 25. Consequently the pairs of members 24, 25 are associated to form a rectangular supporting frame for the bars 18, which constitute the second grid.

Secured in suitable journals 30 mounted upon the main frame 31 of the apparatus are a pair of rotatable shafts 32. These shafts are connected to be rotated in unison by bevel gears 33, 34 and counter-shaft 35. Preferably the gears are enclosed within housings 36 and the shafts are covered by a guard 37.

Driving movement is imparted to one of the shafts 32 by means of any suitable prime mover such as an electric motor 42 and any appropriate driving connection such as belt 43 enclosed within the housing 44.

Upon each of the transverse shafts 32 there are mounted two pairs of eccentrics 38, 39, and surrounding the eccentrics are two pairs of straps 40, 41 respectively. The inner pair of straps are connected to the supporting frame members 15, 16 for the first set of screening elements 10, 11. The other eccentric straps 41 are operatively connected to the frame members 25 of the rectangular supporting frame for the other set of screening elements 18. The two pairs of cams on each of the transverse shafts are oppositely pitched, so that when one pair is in the upwardly extended position, the other pair is downwardly extended.

Because of the fact that each of the units of the screening body is mounted at its opposite ends upon uniformly rotating cams, it will be given a translational movement upon a substantially circular orbit. Although the movements of the two grids or sets of screening elements are substantially identical, they are oppositely timed, and one set is always moving in a direction opposite to the direction of movement of the other. However, the rotational or translational movement of the two units with respect to the axis of a common orbit is always in the same direction.

By this arrangement, it will be seen that the upper edges of the bars 10 and fingers 11 will be caused to move upwardly between and relatively to the upper edges of the plates 18, as well as relatively lengthwise of those plates, to exert a combing action on a mass of material deposited on the screening body. Subsequently and as the upper edges of the plates 10 and fins 11 move downwardly, the upper edges of the plates 18 will move upwardly therebetween and into combing contact with the material. The result of such relative movement between the two grids or sets of screening elements is to separate the desired relatively small granules or particles from the mass of material, and to allow the same to fall through the spaces defined by the upper edges of members 10, 11 and 18.

The above described relative movement between the two grids also imparts a longitudinal movement to any material which is not passed through the screen. Since the two elements always travel in the one direction during an upper portion of their translational movements, and because they are disposed in supporting relation to material on the screen, primarily while in such upper position, the grids tend to move the material only in one direction, namely toward the discharge end 45 of the machine.

Above the screening surface, I provide an appropriate material receiving hopper comprising downwardly and inwardly inclined front and rear end walls 46, 47 and side walls 48, 49. The side walls are elongated and extend the entire length of the screen, and the rear end wall 47 of the hopper is disposed across the space between the side walls, at a point intermediate their ends.

Means for retarding the passage of material lengthwise of the screen are provided, and preferably this means takes the form of a plurality of weighted arms 50, each of which is pivoted to a transverse shaft 51 secured at its ends in brackets 52 mounted on the exterior of the hopper. Each weighted arm 50 is connected adjacent its free end to a chain or the like 53, and each chain is secured by means of an eye-bolt 54 or some equivalent connection to a winding bar 55. The bar 55 may be formed of angle stock, and is connected to shafts 56 journalled in the vertical supports or braces 57 for the hopper, and arranged to be rotated by an appropriate handle 58. Thus, by manipulation of the handle, the angle bar 55 may be turned to raise or lower the weighted arms 50 to permit the free passage of more or less material thereunder. Furthermore, by this means, the weighted arms 50 may be withdrawn to an inoperative position.

Since the force of gravity exerted upon the weighted arms 50 is constant, a large object will displace the individual arms with equal facility as a small object. The resistance to deflection of the arms is, of course, substantially constant. Thus, any foreign object which is sufficiently small to pass under the shaft 45 and the adjacent end of the hopper will be able to pass by the arms 50, but a constant retarding force will be exerted upon any material capable of being broken up and passed through the screen.

A consideration of the relation of the several elements comprising my improved screen reveals that there are no substantially horizontal upwardly disposed surfaces which may catch and retain relatively small impurities which have passed by the upper surfaces of the screening elements. Consequently, it is impossible for such impurities to become wedged between the two grids of this screen and thereby interfere with the proper relative movements of the parts. When the screened material has once passed the upper edges of the elements 10, 11 and 18, its passage to the discharge hopper 59 is unobstructed. Consequently, clogging is impossible.

I claim:

1. In a screening apparatus, a screen comprising two grids mounted for relative movement to cause material placed thereon and not passed therethrough to travel toward one end of said screen, in combination with means adapted to exert a retarding force on such material at one point during its travel toward said end, said means comprising a plurality of inclined weighted arms pivoted above the screen and depending toward said screen in position to be displaced by the material passing over said screen and pivoted at their upper ends about a common axis extending transversely to said line of travel, each of said arms being enlarged at its lower end to impart weight thereto, the resistance of said arms to displacement being substantially constant irrespective of the amount or size of the material passing thereunder, and means independent of the pivotal connection of the arms for supporting the free ends thereof above the screen, said means being movable to change the clearance between said ends of said arms and said screen, or to move the arms and support them in an inoperative position.

2. In a screening apparatus, a screen having a screening body comprising a plurality of parallel movable members, alternate members of said body being connected together to form one active movable unit and the other alternate members thereof being connected together to form a second active movable unit, the members of the first unit comprising horizontally elongated vertically disposed plates having continuous, uninterrupted plane side faces, the members of the second unit comprising horizontally elongated vertically disposed plates having laterally extending vertically disposed, plate-like fins projecting from their side faces toward the adjacent side faces of the members of the first unit and terminating in close proximity thereto, and means for supporting opposite ends of said units and for imparting equal oppositely timed translational movements on circular orbits to said ends of said two units.

3. In a screening apparatus, a screen having a screening body comprising a plurality of parallel movable members, alternate members of said body being connected together to form one active movable unit and the other alternate members thereof being connected together to form a second active movable unit, the members of the first unit comprising horizontally elongated vertically disposed plates having continuous, uninterrupted plane side faces, the members of the second unit comprising horizontally elongated vertically disposed plates having laterally extending vertically disposed, plate-like fins projecting from their side faces toward the adjacent side faces of the members of the first unit and terminating in close proximity thereto, the upper edges of said fins and the plates of the second unit lying in a common plane, and means for supporting opposite ends of said units and for imparting equal oppositely timed translational movements on circular orbits to said ends of said two units.

4. In a screening apparatus, a screening body comprising two sets of substantially horizontally disposed active screening elements adapted to impart linear movement to material placed thereon and not passed therethrough toward the discharge end thereof, in combination with means to exert a retarding force to such movement, said means comprising a transverse shaft above the screen, a plurality of independently movable arms freely pivoted in side by side relation on said shaft and disposed across the screening body and extending toward the same in rearwardly inclined relation, whereby material moving on said screen will swing the arms upwardly against the force of gravity when passing thereunder, each of said arms being of substantial vertical thickness at its lower end and thereby weighted, a transverse bar rotatably mounted above said screen, and a connection between said bar and each of said arms serving to support the lower end of each arm in proper spaced relation to the screen, rotation of said bar serving to raise all of said arms in unison, to change the spaced relation to said screen at which the arms are supported, or to render the arms inoperative.

GEORGE F. ROYER.